(12) United States Patent
Won

(10) Patent No.: US 12,151,752 B2
(45) Date of Patent: Nov. 26, 2024

(54) STEERING AUXILIARY MOTOR CONTROL DEVICE IN EPS SYSTEM, AND METHOD THEREOF

(71) Applicant: HL MANDO CORPORATION, Pyeongtaek-si (KR)

(72) Inventor: Jongchun Won, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 243 days.

(21) Appl. No.: 17/416,906

(22) PCT Filed: Dec. 18, 2019

(86) PCT No.: PCT/KR2019/017933
§ 371 (c)(1),
(2) Date: Jun. 21, 2021

(87) PCT Pub. No.: WO2020/130604
PCT Pub. Date: Jun. 25, 2020

(65) Prior Publication Data
US 2022/0063719 A1 Mar. 3, 2022

(30) Foreign Application Priority Data
Dec. 20, 2018 (KR) .................. 10-2018-0166097

(51) Int. Cl.
*B62D 1/00* (2006.01)
*B62D 1/28* (2006.01)
(Continued)

(52) U.S. Cl.
CPC ........... *B62D 6/002* (2013.01); *B62D 5/0481* (2013.01); *B62D 15/021* (2013.01)

(58) Field of Classification Search
None
See application file for complete search history.

(56) References Cited

U.S. PATENT DOCUMENTS 4,727,950 A 3/1988 Shimizu et al.
8,892,308 B2 * 11/2014 Davis .................. B62D 1/286
701/41

(Continued)

FOREIGN PATENT DOCUMENTS

JP H11198842 A 7/1999
JP 2005280541 A 10/2005
(Continued)

OTHER PUBLICATIONS

International Search Report (with partial translation) and Written Opinion issued in corresponding International Patent Application No. PCT/KR2019/017933, dated Dec. 18, 2019.
(Continued)

*Primary Examiner* — Jonathan M Dager
*Assistant Examiner* — Laura E Linhardt
(74) *Attorney, Agent, or Firm* — Hauptman Ham, LLP

(57) ABSTRACT

Disclosed are a steering auxiliary motor control device and a method thereof, the device comprising: a receiving unit for receiving steering angle information and driver steering torque information from a sensor included in a vehicle; a maximum steering angle determination unit for determining the maximum steering angle of the vehicle on the basis of the steering angle information and preset reference steering angle information; and a limited motor torque determination unit for determining limited motor torque for limiting maximum motor torque outputted from a steering auxiliary motor on the basis of a first condition including the steering angle information, the maximum steering angle information, and steering angle holding time information and/or a second condition including the driver steering torque information, over-torque limit entry torque information, over-torque limit release torque information, and steering torque holding time information.

15 Claims, 8 Drawing Sheets

(51) Int. Cl.
      *B62D 5/04*       (2006.01)
      *B62D 6/00*       (2006.01)
      *B62D 6/10*       (2006.01)
      *B62D 15/02*       (2006.01)

(56) References Cited

U.S. PATENT DOCUMENTS

2010/0198462 A1\*   8/2010   Shinoda .................. H02P 21/02
                                                                           318/560
2015/0284023 A1\*  10/2015   Lengrais .............. B62D 5/0469
                                                                           701/41

FOREIGN PATENT DOCUMENTS

| | | |
|---|---|---|
| JP | 2010-178548 A | 8/2010 |
| JP | 2011-15593 A | 1/2011 |
| JP | 2018176778 A | 11/2018 |
| KR | 10-20180127824 A | 11/2018 |

OTHER PUBLICATIONS

Korean Office Action issued on Oct. 10, 2023, in connection with the Korean Patent Application No. 10-2018-0166097, with English translation (16 pages).

\* cited by examiner

STEERING AUXILIARY MOTOR CONTROL DEVICE IN EPS SYSTEM, AND METHOD THEREOF

CROSS-REFERENCE OF RELATED APPLICATIONS

This application is the U.S. National Phase under 35 U.S.C. § 371 of International Patent Application No. PCT/KR2019/017933, filed on Dec. 18, 2019, which claims the benefit of Korean Patent Application No. 10-2018-0166097, filed on Dec. 20, 2018, the entire disclosures of each are incorporated by reference herein.

TECHNICAL FILED

The present disclosure relates to a method and device for controlling a steering auxiliary motor in an EPS system, more particularly, related to a method and device for limiting the maximum torque of the steering auxiliary motor based on the steering angle information and the steering torque information to prevent over-torque of the steering auxiliary motor in the EPS system.

BACKGROUND ART

An electric power steering (EPS) system refers to a system that applies an auxiliary steering force to the driver's steering force using a motor. In order to assist the driver's steering force, a current is applied to a steering auxiliary motor or a steering assist motor to generate the auxiliary steering force.

However, since the steering auxiliary motor used in the EPS system is a small and high-efficiency motor, a large amount of current flows along the coil inside the motor, and accordingly, there may be generated heat which is proportional to the winding resistance of the motor and proportional to the square of the amount of current. Since the winding resistance of a motor is a physically fixed value, the amount of heat generated is proportional to the square of the current.

Therefore, if the driver continuously steers the steering wheel for driving behavior such as parking, there may be reached the internal heat resistance limit due to heat accumulation in the steering auxiliary motor of the EPS system, so that there was a problem in that the efficiency of the motor itself was deteriorated or the motor is damaged due to overheating.

DISCLOSURE

Technical Problem

In this background, an embodiment of the present disclosure is to provide a steering auxiliary motor control device and method capable of preventing reaching the internal heat resistance limit of the motor by preventing unnecessary torque application of the steering auxiliary motor, and capable of efficiently using the heat capacity of the motor In addition, an embodiment is to provide a steering auxiliary motor control device and method capable of limiting a maximum torque of the steering auxiliary motor to the set limited motor torque if it is determined that the driver's manipulation is unnecessarily consuming the steering assist power based on the steering angle information and the steering torque information.

Technical Solution

An aspect of the present disclosure may provide a steering auxiliary motor control device including a receiver for receiving steering angle information and driver steering torque information from a sensor included in a vehicle, a maximum steering angle determiner for determining a maximum steering angle of the vehicle based on the steering angle information and a preset reference steering angle information, and a limited motor torque determiner for determining a limited motor torque for limiting maximum motor torque outputted from a steering auxiliary motor based on at least one of a first condition including the steering angle information, maximum steering angle information and steering angle holding time information, and a second condition including the driver steering torque information, over-torque limit entry torque information, over-torque limit release torque information and steering torque holding time information.

In addition, another aspect of the present disclosure may provide a steering auxiliary motor control method including receiving steering angle information and driver steering torque information from a sensor included in a vehicle, determining a maximum steering angle of the vehicle based on the steering angle information and a preset reference steering angle information, and determining a limited motor torque for limiting maximum motor torque outputted from a steering auxiliary motor based on at least one of a first condition including the steering angle information, maximum steering angle information and steering angle holding time information, and a second condition including the driver steering torque information, over-torque limit entry torque information, over-torque limit release torque information and steering torque holding time information.

Advantageous Effects

According to an embodiment of the present disclosure, there may provide the effects of improving the stability and efficiency of the EPS system by preventing unnecessary torque application of the steering auxiliary motor in the EPS system and preventing the heat resistance limit inside the motor In addition, according to an embodiment of the present disclosure, it is possible to prevent unnecessary torque application of the steering auxiliary motor and improve stability and efficiency of the EPS system by providing a more accurate limited motor torque value in cases where the driver steering angle is about to exceed the maximum steering angle.

MODE FOR DISCLOSURE

The present disclosure discloses a steering auxiliary motor control device and method.

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

A steering auxiliary motor control device controls a steering assist motor or a steering auxiliary motor in the EPS system, and performs a function of suppressing the steering assistance force when it is determined that excessive steering assistance force is applied to the steering auxiliary motor. A maximum motor torque will be described as a maximum amount of torque the motor can have due to the maximum output of the steering auxiliary motor. This is a value of a unique property of a motor, and although the value may be different for each motor, it will be collectively described in that each motor has a maximum output torque. However, there is no limitation on the terms of the motor torque.

Hereinafter, it will be described a device and method for controlling a steering auxiliary motor according to the present disclosure with reference to the drawings.

Figure 1:
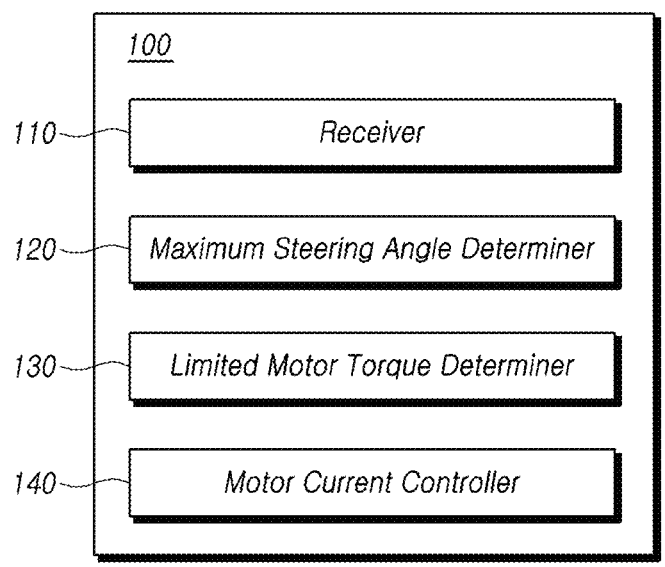
FIG. 1 is a diagram for explaining a configuration of a steering auxiliary motor control apparatus according to an embodiment.

FIG. 1 is a diagram for explaining a configuration of a steering auxiliary motor control apparatus according to an embodiment.

Referring to FIG. 1, a steering auxiliary motor control device 100 according to an embodiment may include a receiver 100 for receiving steering angle information and driver steering torque information from a sensor included in a vehicle, a maximum steering angle determiner 120 for determining a maximum steering angle of the vehicle based on the steering angle information and a preset reference steering angle information, a limited motor torque determiner 130 for determining a limited motor torque for limiting maximum motor torque outputted from a steering auxiliary motor based on at least one of a first condition including the steering angle information, maximum steering angle information and steering angle holding time information, and a second condition including the driver steering torque information, over-torque limit entry torque information, over-torque limit release torque information and steering torque holding time information, and a motor current controller 140 for controlling the steering auxiliary motor based on the limited motor torque information.

The receiver 110 of the steering auxiliary motor control device 100 according to an embodiment may receive steering angle information and steering torque information through a steering angle sensor or a steering torque sensor mounted in the vehicle. In addition, according to an embodiment, there may be a plurality of sensors configured inside or outside the vehicle that generate information received by the receiver 110. In addition, the sensor may be a preliminary sensor in preparation for sensor error or failure in the vehicle, and the steering angle information or steering torque information received by the receiver 110 may be information about an estimated value calculated using another sensor, not information directly received through the aforementioned sensor.

Alternatively, the receiver 110 may calculate steering angle information or steering torque information by using the information received from the above-described sensor. For example, if the steering angle sensor is in error or malfunctions, the receiver 110 may use the steering angle information calculated by estimating the driver's steering angle information using the torque information received from the torque sensor. As another example, if the steering torque sensor fails, the receiver 110 may use the steering torque information calculated by estimating the driver's steering torque information using the received steering angle information. In addition, the information received by the receiver 110 according to an embodiment is not limited to steering angle information or steering torque information, but may include steering angle holding time information, steering torque holding time information, and torque information of the steering auxiliary motor.

Meanwhile, the maximum steering angle determiner 120 according to an embodiment may compare the steering angle information with a reference steering angle information, and, if the value of the steering angle information exceeds the value of the reference steering angle information, may update the reference steering angle information with the steering angle information. The maximum steering angle determiner 120 may set the updated reference steering angle information as the maximum steering angle information.

In this case, the information for determining the excess is the respective steering angle values of the steering angle information and the reference steering angle information, and, if the steering angle by the driver becomes greater than the reference steering angle, the maximum steering angle determiner 120 may update the reference steering angle information to the steering angle information. Thereafter, the maximum steering angle determiner 120 may set the reference steering angle as the maximum steering angle. Through this, it is possible to update the value of the maximum steering angle set as a default value in the manufacturing process of the vehicle with the value of the maximum steering angle of the actual vehicle. Accordingly, the maximum steering angle information serving as a reference for determining the limited motor torque according to the first condition is updated with the maximum steering angle information of the actual vehicle, thereby more accurately determining the limited motor torque.

In an embodiment, the maximum steering angle determiner 120 may be set to update the reference steering angle to the maximum steering angle when a preset in-vehicle event occurs. That is, as described above, the maximum steering angle determiner 120 may be set to immediately update the maximum steering angle value when the steering angle by the driver becomes greater than the reference steering angle, or may be set to update when a predetermined event occurs. An example of the predetermined event may be a stop of ignition of the vehicle, a stop of driving of the vehicle, an operation through a separate button, a preset specific timeout, etc. That is, if it is possible to be used as a reference point for setting the reference steering angle as the maximum steering angle, the type of event is not limited and may be designated according to a user setting or a vehicle setting.

In addition, a reference steering angle information of the steering auxiliary motor control device 100 according to an embodiment may include a clockwise reference steering angle information in case of rotating in a clockwise direction with respect to a zero steering angle and a counterclockwise reference steering angle information in case of rotating in a counterclockwise direction with respect to a zero steering angle. The maximum steering angle determiner 120 may distinguish between a case in which the steering angle information is input by being rotated clockwise based on the zero point steering angle and a case in which the steering angle information is input by being rotated counterclockwise, and may compare with the clockwise reference steering angle information and the counterclockwise reference steering angle information, respectively.

That is, in an embodiment, the reference steering angle may be distinguished in two directions. Since the steering range of the vehicle can be divided into clockwise and counterclockwise directions, a case where the steering angle (absolute steering angle) is 0 may be set as the zero steering angle. Accordingly, the maximum steering angle determiner 120 may distinguish between information input in a clockwise direction and information input in a counterclockwise direction based on the zero steering angle. For example, the maximum steering angle determiner 120 may distinguish between the clockwise reference steering angle information when rotating in a clockwise direction based on the zero steering angle and the counterclockwise reference steering angle information rotating in a counterclockwise direction based on the zero steering angle.

In this case, the steering angle information may also be divided into a case of being input by rotating in a clockwise based on the zero steering angle and a case of being input by rotating in a counterclockwise direction. Accordingly, if the clockwise rotational steering angle exceeds the clockwise reference steering angle, the maximum steering angle determiner 120 updates the steering angle information to the clockwise reference steering angle information, but the counterclockwise reference steering angle may be maintained. Similarly, if the counterclockwise rotational steering angle exceeds the counterclockwise reference steering angle, the maximum steering angle determiner 120 updates the steering angle information to the counterclockwise reference steering angle information, but the clockwise reference steering angle may be maintained.

In addition, the limited motor torque determiner 130 according to an embodiment may determine a limited motor torque of the steering auxiliary motor to limit the maximum value of the torque output from the steering auxiliary motor to a predetermined value. For example, the limited motor torque may be a value for limiting the maximum motor torque output by the steering auxiliary motor to a predetermined value. For example, the limited motor torque may be calculated as a predetermined ratio of the maximum motor torque output of the steering auxiliary motor. That is, the limited motor torque is set to a value within the maximum motor torque of the steering auxiliary motor to limit the maximum motor torque, and may be preset or calculated through the above-described operation.

In order to set the limited motor torque, the limited motor torque determiner 130 may use the steering angle information or the steering torque information received from the receiver 110.

Meanwhile, the limited motor torque determiner 130 may include a first limited torque determiner 210 and a second limited torque determiner 220.

As an example, if it is determined that the state in which the steering angle information coincides with the maximum steering angle information is maintained for more than a preset first time, the limited motor torque determiner 130 may determine a first limited torque set to be less than or equal to the maximum motor torque value as the limited motor torque. In this case, the first limited torque may be determined as a predetermined ratio of the maximum motor torque value.

As another example, if it is determined that the driver steering torque information maintains more than an over-torque limit entry torque information for more than a preset second time, the limited motor torque determiner 130 may determine a second limited torque set to be equal to or less than the maximum motor torque value as the limited motor torque. In this case, the second limited torque may be determined as a predetermined ratio of the maximum motor torque value.

In this way, the limited motor torque determiner 130 may include the first limited torque determiner 210 for determining the first limited torque as the limited motor torque based on the steering angle information and the maximum steering angle information, and the second limited torque determiner 220 for determining the second limited torque as the limited motor torque based on the driver steering torque information and the over-torque limit entry torque information.

That is, the limited motor torque determiner 130 performs over-torque prevention in the overall case using the second limited torque based on the driver steering torque information, and may perform over-torque prevention in the case that the steering angle by the driver reaches the maximum steering angle of the vehicle by using the first limited torque based on the steering angle information.

Meanwhile, in the case that the limited torque is calculated by dividing the above-described first limited torque and the second limited torque, it is required to determine which limited torque to determine as the limited motor torque.

For example, if conditions to which the first limited torque and the second limited torque are applied overlap and are satisfied, the limited motor torque determiner 130 may determine the limited motor torque based on each value of the first limited torque and the second limited torque and the preset conditions. In this case, the conditions to which the first limited torque and the second limited torque are applied overlap and are satisfied may mean a case in which the driver continues to apply the steering torque even after turning the steering wheel to the maximum steering angle.

For example, the limited motor torque determiner 130 may determine the limited motor torque based on a preset priority among the first limited torque and the second limited torque. For example, if the first limited torque is determined by satisfying the first limited torque condition when the priority is set so that the first limited torque has priority, the limited motor torque may be determined as the first limited torque regardless of the second limited torque value. That is, when the steering angle by the driver reaches the maximum steering angle, the limited motor torque determiner 130 may determine the limited motor torque only by the first limited torque.

As another example, the limited motor torque determiner 130 may determine a smaller value of the first limited torque and the second limited torque as the limited motor torque. For example, the limited motor torque may be determined according to a comparison result of the first limited torque and the second limited torque.

As another example, the limited motor torque determiner 130 may apply a preset weight to at least one of the first limited torque and the second limited torque, and determine an average value of the values to which the weight has been applied as the limited motor torque.

Meanwhile, the steering auxiliary motor control device 100 may further include a motor current controller 140 for controlling the steering auxiliary motor based on limited motor torque information.

The motor current controller 140 may control the control current value corresponding to the limited motor torque to be the maximum current value supplied to the steering auxiliary motor when the limited motor torque is determined by the limited motor torque determiner 130. In this case, the motor current controller 140 may perform motor current control by dividing a case in which the limited motor torque is determined by the steering angle information and a case in which the limited motor torque is determined by the steering torque information.

As described above, the receiver 110, the maximum steering angle determiner 120, the limited motor torque determiner 130 and the motor current controller 140 of the steering auxiliary motor control device 100 may be implemented by one or more microprocessors operated by a program, and the set program may include a series of instructions for performing each step included in the torque control method according to an embodiment of the present disclosure to be described later.

In the above, it has been schematically described the configuration of the steering auxiliary motor control device 100 and the operation thereof. Hereinafter, it will be described an operation of each component of the steering auxiliary motor control device 100 in detail with reference to FIGS. 2 to 7.

Figure 2:
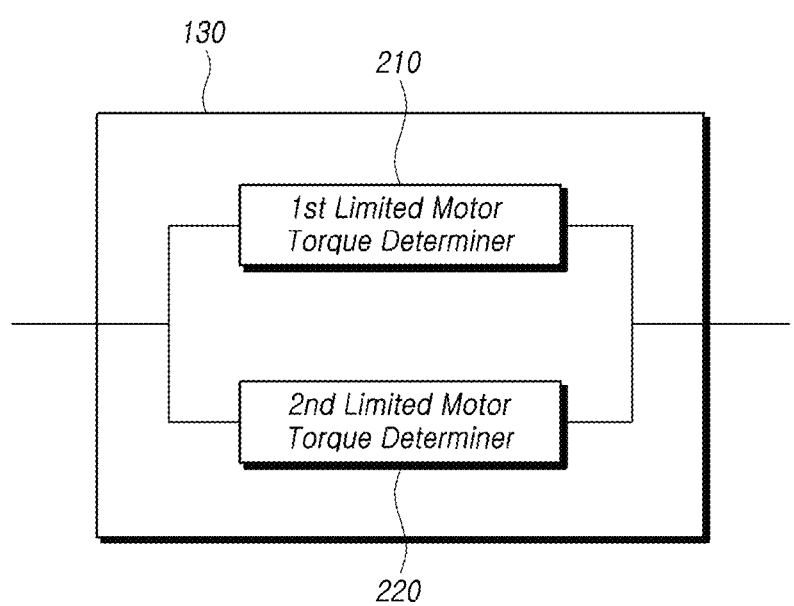
FIG. 2 is a diagram for explaining an operation of the limited motor torque determiner according to an embodiment.

FIG. 2 is a diagram for explaining an operation of the limited motor torque determiner 130 according to an embodiment.

Referring to FIG. 2, the limited motor torque determiner 130 may determine the limited motor torque to limit the maximum motor torque output by the steering auxiliary motor of the EPS system.

For example, the limited motor torque determiner 130 may be configured by being divided into a first limited torque determiner 210 and a second limited torque determiner 220. This is described separately for convenience of description, and may be implemented by one processor or may be functionally divided and performed within one processor.

Specifically, if it is determined that the state in which the steering angle information coincides with the maximum steering angle information is maintained for a preset first time or longer, the first limited torque determiner 210 may set the maximum output torque of the steering auxiliary motor as the first limited torque to determine the limited motor torque as the first limited torque. In this case, the maximum steering angle information, the first time, and the first limited torque will be described in more detail with reference to FIGS. 3 and 4 later.

In addition, if it is determined that the driver steering torque maintains more than the preset over-torque limit entry torque information for more than a preset second time, the second limited torque determiner 220 may set the maximum output torque of the steering auxiliary motor as the second limited torque to determine the limited motor torque as the second limited torque. In this case, the second time, the over-torque limit entry torque, and the second limited torque will be described in more detail with reference to FIG. 5 later.

That is, as above, the limited motor torque determiner 130 may determine the corresponding limited torque as the limited motor torque in the case that a condition is satisfied in any one of the first limited torque determiner 210 and the second limited torque determiner 220.

However, there may be cases in which the conditions to which the first limit torque and the second limit torque are applied overlap and satisfy. As an example, after the first limited torque determination condition is satisfied by the first limited torque determiner 210, the second limited torque determination unit 220 may also satisfy in the second limited torque determiner 220. Conversely, there may be a case where the first limited torque is determined after determining the second limited torque. In addition, since the determination of the first limited torque and the second limited torque may be continued for a predetermined time, each limited torque determination does not have to be determined at the same time, and there may be a case in which the other limited torque is determined while one limited torque has been determined and maintained.

Accordingly, in this case, the limited motor torque determiner 130 is required to determine the limited motor torque for limiting the output of the steering auxiliary motor based on the respective values of the first and second limited torques. For example, the limited motor torque determiner 130 may finally determine the limited torque value that the steering auxiliary motor can output to the maximum based on the first limited torque value and the second limited torque value.

For example, the limited motor torque determiner 130 may determine the limited motor torque based on a preset priority among the first limited torque and the second limited torque.

As another example, the limited motor torque determiner 130 may determine a smaller value of the first limited torque and the second limited torque as the limited motor torque. That is, if the steering angle by the driver reaches the maximum steering angle, the limited motor torque determiner 130 may determine the limited motor torque only by the first limited torque.

As another example, the limited motor torque determiner 130 may apply a preset weight to at least one of the first limited torque and the second limited torque, and may determine an average value of the weighted values as the limited motor torque. In this case, the weight assigned for either one of the first limited torque and the second limited torque may be 1. That is, if a weight of 1 is assigned to the first limited torque, the weight of the second limited torque may be 0, and if a weight of 1 is assigned to the second limited torque, the weight of the first limited torque may be 0. Alternatively, the weight may be preset between 0 and 1. For example, a weight of 0.5 may be set to the first limited torque and a weight of 0.5 may be set to the second limited torque. In this case, the limited motor torque determiner 130 may determine the average of the value calculated by multiplying the first limited torque by 0.5 as a weight and the value calculated by multiplying the second limited torque by 0.5 as the weight as the limited motor torque. In addition, for example, a weight of 0.2 may be set to the first limited torque and a weight of 0.8 may be set to the second limited torque. In this case, the limited motor torque determiner 130 may determine an average of a value calculated by multiplying the first limited torque by 0.2 as a weight and a value calculated by multiplying the second limited torque by a weight of 0.8 as the limited motor torque.

In addition, without being limited to the above-described embodiment, the limited motor torque determiner 130 may determine the limited motor torque according to a user's setting, etc. if the first and second limited torque overlap and are satisfied.

Through the above-described operation, the limited motor torque determiner 130 may control the maximum motor torque that the steering auxiliary motor can have to be limited, thereby limiting the output of the steering auxiliary motor. Accordingly, it is possible to prevent unnecessary provision of steering assistance force even when the driver performs excessive steering.

Figure 3:
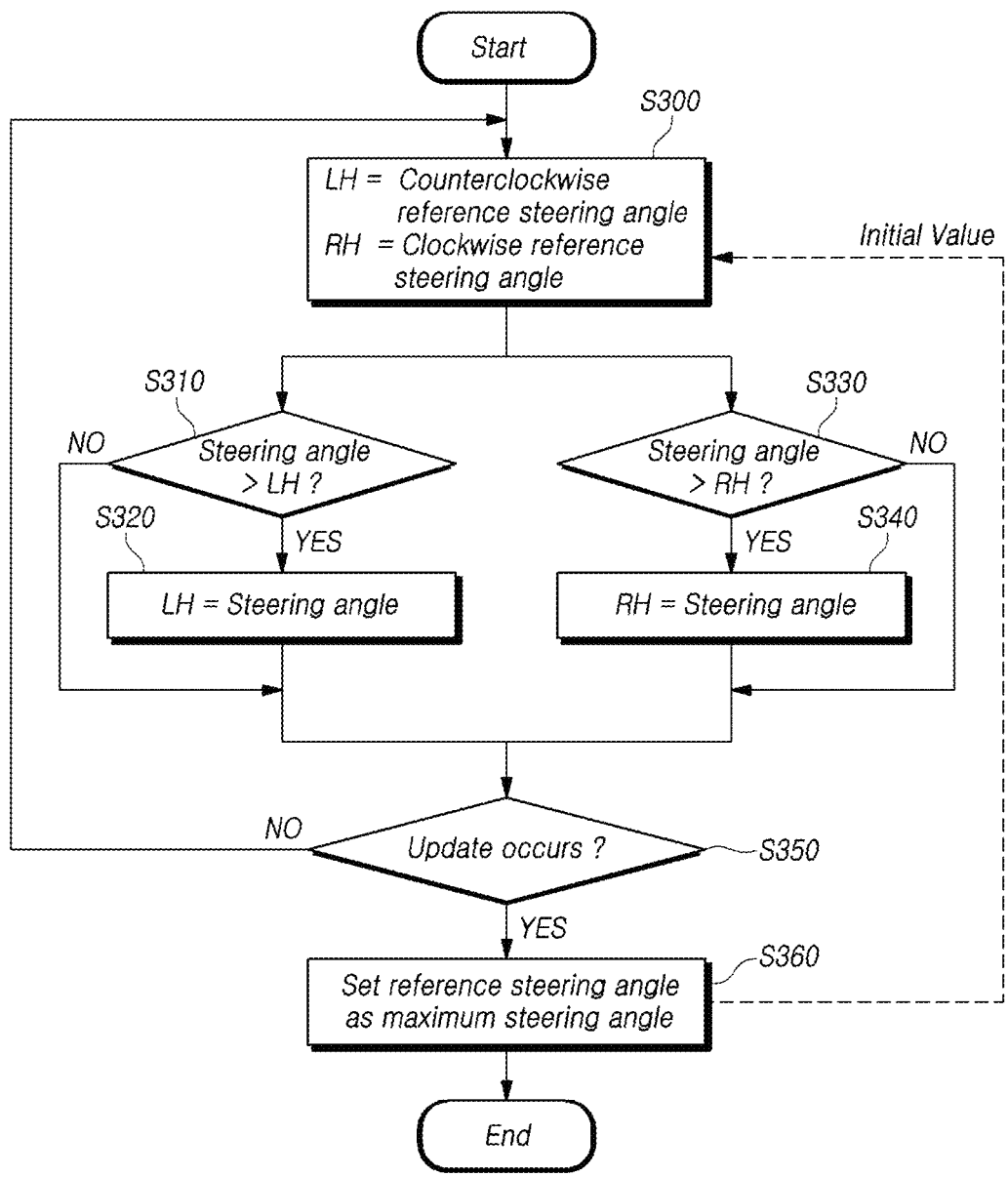
FIG. 3 is a diagram for explaining an operation of the maximum steering angle determiner according to an embodiment.

FIG. 3 is a diagram for explaining an operation of the maximum steering angle determiner 120 according to an embodiment.

Referring to FIG. 3, the maximum steering angle determiner 120 proceeds from an initial value of the reference steering angle, may compare the steering angle with the reference steering angle, and may set the reference steering angle as the maximum steering angle if the steering angle exceeds the reference steering angle. Also, the comparison with the steering angle may be performed by reflecting the maximum steering angle as an initial value of the reference steering angle again.

Specifically, the maximum steering angle determiner 120 may receive the initial value of the reference steering angle. As described above, since the steering angle information steered by the driver may be divided into a clockwise direction and a counterclockwise direction based on 0 degrees, the reference steering angle may be divided into a clockwise direction and a counterclockwise direction based on a zero steering angle (S300). In this specification, the zero steering angle means an absolute steering angle of 0 degrees, and may mean a steering angle at which the vehicle performs a straight-line driving.

Therefore, if the steering angle information received from the receiver 110 is input by being rotated clockwise with respect to the zero steering angle, the maximum steering angle determiner 120 may perform the comparison with the clockwise reference steering angle information RH(S330). If the steering angle information exceeds the clockwise reference steering angle information RH (YES in step S330), the maximum steering angle determiner 120 may update the input steering angle information to the clockwise reference steering angle information RH (S340). In the case of not exceeding, it may not be updated (NO in step S330).

Similarly, if the steering angle information input from the receiver 110 is input by being rotated counterclockwise based on the zero steering angle, the maximum steering angle determiner 120 may compare it with the counterclockwise reference steering angle information LH(S310). If the steering angle information exceeds the counterclockwise reference steering angle information LH (YES in step S310), the maximum steering angle determiner 120 may update the input steering angle information to the counterclockwise reference steering angle information LH (S320). If it is not exceeded, it may not be updated (NO in step S310).

The maximum steering angle determiner 120 may determine whether the update of the reference steering angle occurs (S350). The maximum steering angle determiner 120 may update the reference steering angle information to the steering angle information if the steering angle by the driver is greater than the reference steering angle.

However, according to an example, the maximum steering angle determiner 120 may be set to update the reference steering angle to the maximum steering angle when a preset in-vehicle event occurs. That is, as described above, the maximum steering angle determiner 120 may immediately update the maximum steering angle value when the steering angle by the driver becomes greater than the reference steering angle, or may be set to update when a predetermined event occurs. The event may be preset in the vehicle, such as starting on/off of the vehicle, stopping/driving of the vehicle, or may be determined according to a driver's setting input.

In an embodiment, when the reference steering angle is updated (YES in step S350), the maximum steering angle determiner 120 may set the reference steering angle as the maximum steering angle (S360). For example, if the steering angle input in step S340 or S320 is changed to the reference steering angle, the maximum steering angle may be determined as the changed reference steering angle.

If the reference steering angle is not updated as a result of the determination in step S350 (NO in step S350), steps S300 to S350 may be repeatedly or periodically performed. That is, the process of updating the reference steering angle may be continuously performed by continuously comparing the steering angle information with the reference steering angle information.

If, in the above example, it is set to update when a predetermined event occurs, the maximum steering angle may be maintained if the preset event does not occur.

In addition, in the case that the reference steering angle is set as the maximum steering angle, the maximum steering angle may be set as an initial value of the reference steering angle for comparison of the steering angle information and the reference steering angle information. For example, in the case that the clockwise reference steering angle is 100° but the received steering angle information is 150°, the maximum steering angle information may be set to 150°, and subsequent reference steering angles may be started from 150°. Through this, the value of the maximum steering angle set as a default value in the manufacturing process of the vehicle may be updated with the value of the maximum steering angle of the actual vehicle. Accordingly, the maximum steering angle information serving as a reference for determining the limited motor torque according to the first condition is updated with the maximum steering angle information of the actual vehicle, thereby more accurately determining the limited motor torque. Accordingly, it is possible to more effectively reflect the driver's steering information.

Accordingly, the maximum steering angle determiner 120 may store the steering angle information steered by the driver to the maximum based on the driver's steering information. This may provide the effect of providing a criterion for determining whether the driver is performing unnecessary steering.

Figure 4:
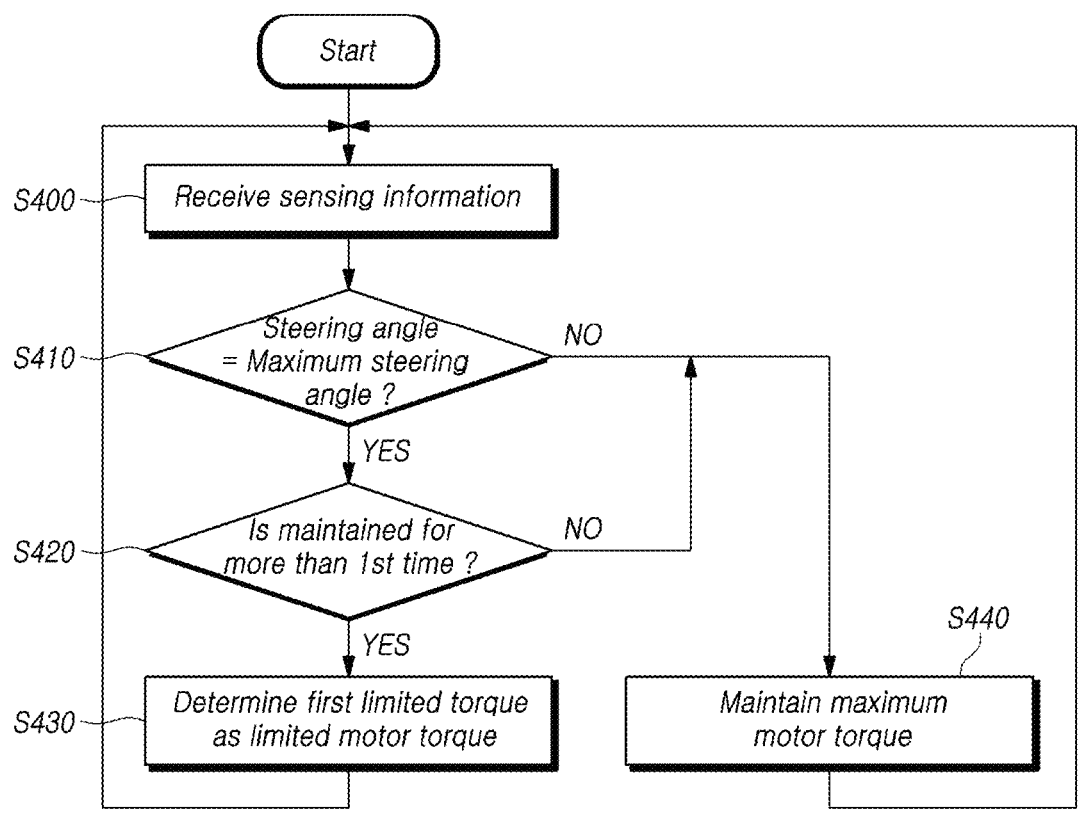
FIG. 4 is a diagram for explaining an operation of the first limited torque determiner according to an embodiment.

FIG. 4 is a diagram for explaining an operation of the first limited torque determiner 210 according to an embodiment.

Referring to FIG. 4, the first limited torque determiner 210 receives the sensing information input from the receiver 110, compares the steering angle information with the maximum steering angle information, and determines whether the maximum steering angle information is maintained for a preset first time or longer. In the case that all of the above conditions are satisfied, the first limited torque determiner 210 may determine the first limited motor torque as the limited motor torque, and if at least one condition is not satisfied, the limiting of the steering auxiliary motor torque may not be performed.

Specifically, the first limited torque determiner 210 may receive the sensing information received from the receiver 110 (S400). The sensing information received by the receiver 110 in step S400 may be steering angle information and steering angle holding time information, for example, it may be steering angle information calculated through other sensors rather than being limited to information sensed by the steering angle sensor.

In addition, the first limited torque determiner 210 may compare the steering angle information with the maximum steering angle information (S410). For example, there may be set whether the steering angle information maintains as the maximum steering angle information as a determination criterion. Alternatively, the first limited torque determiner 210 may set as a criterion for determining whether the steering angle information exceeds the maximum steering angle information. As another example, in the case that the steering angle information is within a predetermined value based on the maximum steering angle information, the first limited torque may be differentially determined. Specifically, if the steering angle information does not maintain more than the maximum steering angle but maintains as a value greater than or equal to 90% of the maximum steering angle information, the first limited torque may be determined as 90% of the first limited torque information calculated when the steering angle information maintains as the same as the maximum steering angle information. Similarly, if the steering angle information does not maintain 90% or more of the maximum steering angle value but maintains a value of 80% or more of the maximum steering angle information, the first limited torque may be determined as 80% of the first limited torque information calculated when the steering angle information maintains as the same as the maximum steering angle information.

As such, in the determination in step S410 of comparing the steering angle information and the maximum steering angle information in the first limited torque determiner 210, if it can provide a criterion for limiting the maximum motor torque of the steering auxiliary motor using the maximum steering angle information, there is no limitation to the applicable embodiment.

As an example, the first limited torque determiner 210 may provide an effect of determining whether the driver is performing unnecessary steering based on the maximum steering angle information set by the maximum steering angle determiner 120. That is, if the driver continues to apply the steering torque even after the driver steering angle reaches the maximum steering angle, there may limit the torque of the steering auxiliary motor since higher current flows to the steering auxiliary motor than usual, which can cause inefficiency and damage.

In addition, in an embodiment, if the driver's steering angle information corresponds to the maximum steering angle, whether the state maintains a preset first time or longer may be included in the limit determination process (S420). In this case, the preset first time may be set by the user, and if it may serve as a reference for determining the limited motor torque with the first limited torque the first limit torque, there is no limitation in the embodiment for the first time. Through this, the first limited torque determiner 210 may more precisely determine the state in which unnecessary steering assistance force is being provided.

According to this operation, if the steering angle information maintains the maximum steering angle (YES in step S410) and this state is maintained for more than a preset first time (YES in step S420), the first limited torque determiner 210 may determine the maximum output of the steering auxiliary motor as the first limited torque (S430). That is, the first limited torque determiner 210 may determine the first limited torque as the limited motor torque.

Meanwhile, if the first limited torque is a value for limiting the output of the steering auxiliary motor, the embodiment is not limited. That is, the first limited torque may have a value equal to or less than the maximum motor torque value of the steering auxiliary motor. In addition, the first limited torque may be a value calculated using a specific formula from the maximum motor torque value. In addition, the first limited torque may be determined as a specific ratio of the maximum motor torque value. Also, the first limited torque may be a predetermined value. In addition, the first limited torque may be a variable value according to a vehicle state or a driver's state. In this case, if it is variable, the vehicle speed, the steering angular speed, the steering torque, and sensor information on the obstacle may be utilized.

However, even if the first limited torque is determined as the limited motor torque, if the steering angle does not maintain the maximum steering angle due to the driver's manipulation later (NO in step S410) or does not maintain the maximum steering angle for the first time (NO in step S420) even if it is maintained as the maximum steering angle, the limited motor torque determination may be released to maintain the maximum motor torque of the steering auxiliary motor (S440). Accordingly, the efficiency of the steering auxiliary motor can be pursued, but if necessary, the output of the steering auxiliary motor torque can be restored to provide the driver with the effect of faithfully assisting the steering assistance force.

Figure 5:
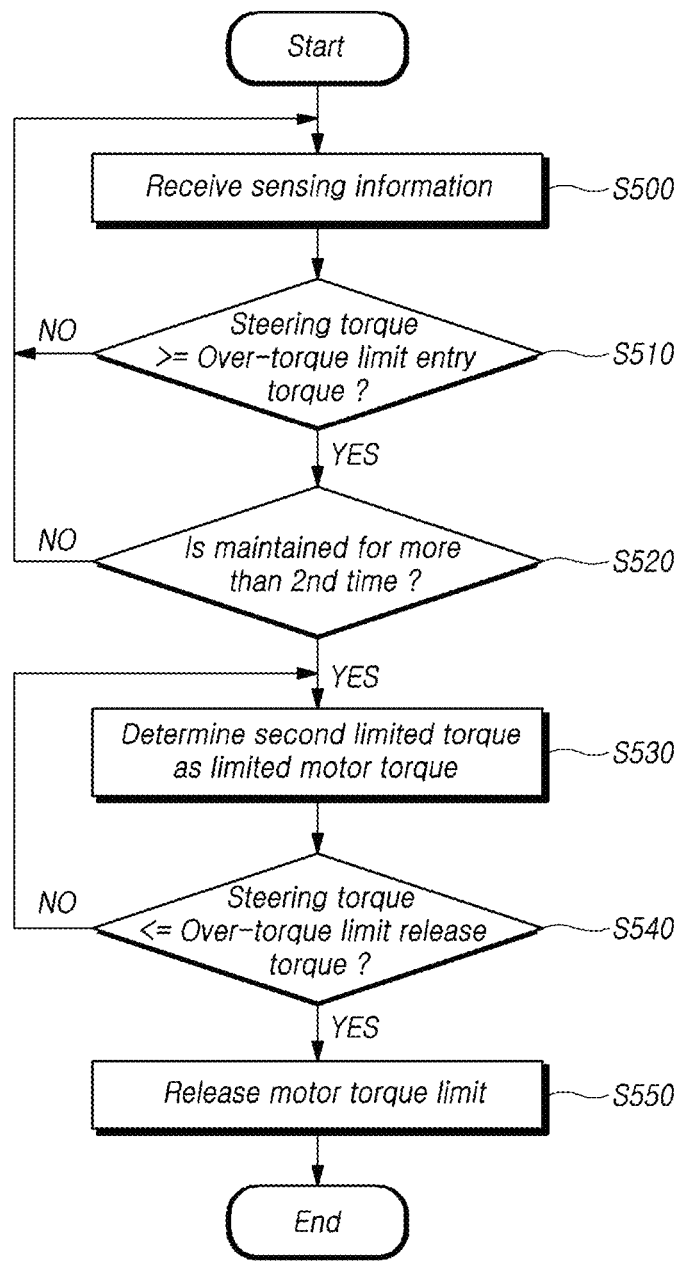
FIG. 5 is a diagram for explaining an operation of the second limited torque determiner according to an embodiment.

FIG. 5 is a diagram for explaining an operation of the second limited torque determiner 220 according to an embodiment.

Referring to FIG. 5, after receiving the sensing information input from the receiver 110, the second limited torque determiner 220 may compare the steering torque information with the over-torque limit entry torque information and determine whether this state is maintained for a second preset time or longer. If all of the above conditions are satisfied, the second limited torque determiner 220 may determine the second limited motor torque as the limited motor torque. Thereafter, the second limited torque determiner 220 may release the limiting of the motor torque when the steering torque is equal to or less than the over-torque limit release torque.

Specifically, the second limited torque determiner 220 may receive the sensing information input from the receiver 110 (S500). The sensing information received by the receiver 110 in step S500 may be steering torque information and steering torque holding time information, and, for example, as described above, this sensing information may be steering torque information calculated through other sensors, rather than being limited to information by the steering torque sensor.

Further, the second limited torque determiner 220 may compare the steering torque information with the preset over-torque limit entry torque information (S510). For example, the second limited torque determiner 220 may determine whether the steering torque information is equal to or greater than the over-torque limit entry torque information. In this case, the preset over-torque limit entry torque may be set to a value as determined to be an excessive motor torque of the steering auxiliary motor, and is a value that can be set by a user according to a specific reference and embodiments, and is not limited to a specific value. For example, this may correspond to a case in which steering torque is continuously applied even when steering cannot be performed, such as when a wheel of a vehicle is caught in an obstacle such as a curb.

As an example, the second limited torque determiner 220 may provide an effect of determining whether the driver is performing unnecessary steering based on preset over-torque limit entry torque information. That is, if the steering auxiliary motor torque value is maintained above the over-torque limit entry torque, there may limit the torque of the steering auxiliary motor since higher current flows to the steering auxiliary motor than usual, which can cause inefficiency and damage.

In addition, in one embodiment, if the user's steering torque information is equal to or greater than the over-torque limit entry torque, whether the state maintains for the preset second time or longer may be included in the determination process (S520). In this case, the preset second time may be determined according to a user's setting, and if it may serve as a reference for determining the limited motor torque with the second limited torque the first limit torque, there is no limitation in the embodiment for the second time. Through this, the second limited torque determiner 220 may more precisely determine the state in which unnecessary steering assistance force is being provided.

According to this operation, if the steering torque information maintains more than the over-torque limit entry torque (YES in step S510) and this state is maintained for more than the preset second time (YES in step S520), the second limit torque determiner 220 may determine the maximum output of the steering auxiliary motor as the second limited torque (S530). That is, the second limited torque determiner 220 may determine the second limited torque as the limited motor torque. On the other hand, if the conditions are not satisfied in steps S510 and S520, the determination operation is repeated from step S500.

Meanwhile, if the second limited torque is a value for limiting the output of the steering auxiliary motor, the embodiment is not limited. That is, the second limited torque may have a value equal to or less than the maximum motor torque value of the steering auxiliary motor. In addition, the second limited torque may be a value calculated using a specific formula from the maximum motor torque value. In addition, the second limited torque may be determined as a specific ratio of the maximum motor torque value. Also, the second limited torque may be a predetermined value. In addition, the second limited torque may be a variable value according to a vehicle state or a driver's state. In this case, if it is variable, the vehicle speed, the steering angular speed, the steering torque, and sensor information on the obstacle may be utilized.

Meanwhile, the second limited torque determiner 220 may compare the steering torque and the over-torque limit release torque after determining the limited motor torque (S540).

For example, after the second limited torque is determined as the limited motor torque, if the steering torque information becomes less than the over-torque limit release torque by the driver's manipulation later (YES in step S540), the limited motor torque determination is released to maintain the maximum motor torque of the steering auxiliary motor (S550). In this case, the preset over-torque limit release torque may be set to a value at which it is determined that excessive motor torque is not provided to the steering auxiliary motor, and may be set by a user according to a specific reference and embodiments, and is not limited to a specific value. Alternatively, the over-torque limit release torque may be preset according to the steering auxiliary motor of the vehicle. If it is determined in step S540 that the steering torque exceeds the over-torque limit release torque, step S530 or step S540 may be repeatedly performed.

Accordingly, it is possible to pursue the efficiency of the steering auxiliary motor, but if necessary, it is possible to provide the effect of faithfully assisting the steering assistance force to the driver by restoring the output of the steering auxiliary motor torque.

Figure 6:
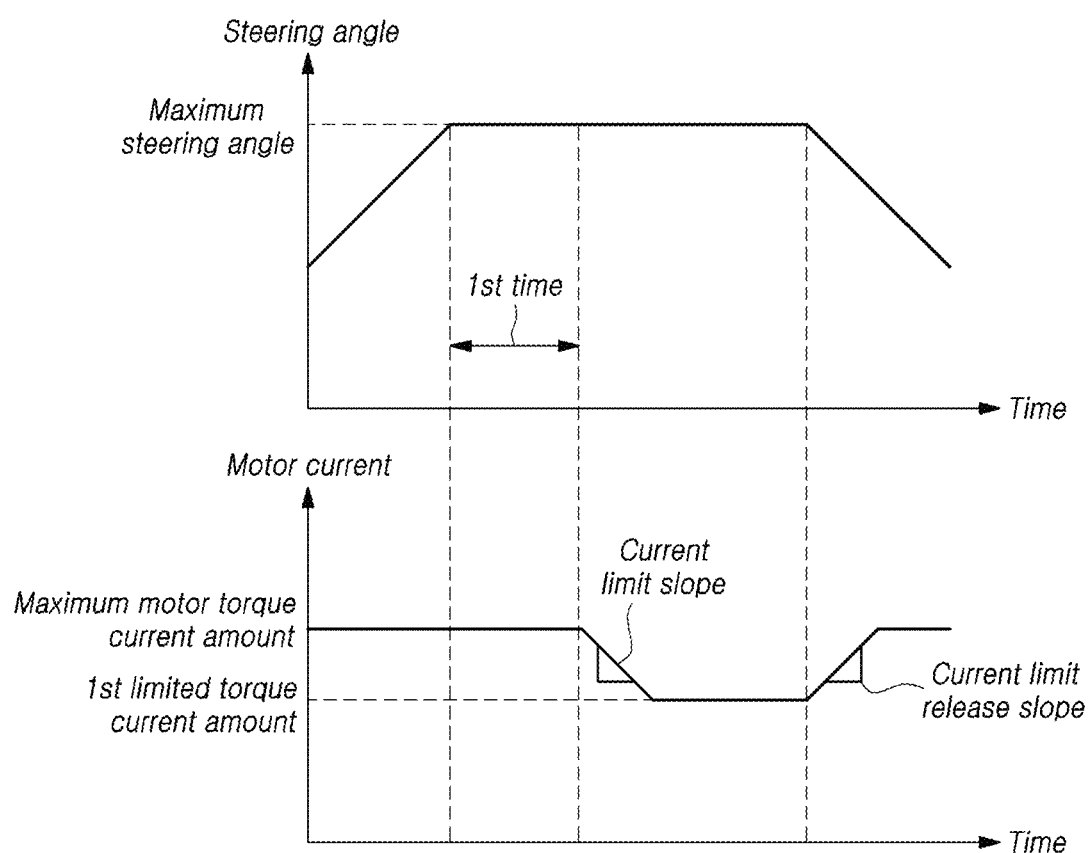
FIG. 6 is a diagram for explaining a method in which a motor current controller controls the maximum current value supplied to the steering auxiliary motor if a limited motor torque is determined as a first limited torque according to an embodiment.

FIG. 6 is a diagram for explaining a method in which a motor current controller 140 controls the maximum current value supplied to the steering auxiliary motor if a limited motor torque is determined as a first limited torque according to an embodiment.

Referring to FIG. 6, the motor current controller 140 according to an embodiment controls the steering auxiliary motor by supplying current based on the limited motor torque information, and if the limited motor torque is determined as the first limited torque, the motor current controller may control the control current value corresponding to the first limited torque to be the maximum current value supplied to the steering auxiliary motor.

Specifically, the motor current controller 140 according to an embodiment may reduce the maximum amount of current supplied to the steering auxiliary motor if the limited motor torque is determined as the first limited torque by the first limited torque determiner 210. As described above, the case in which the limit is determined by the first limited torque may be a case in which the steering angle information maintains as the maximum steering angle for the first time or longer.

In addition, according to an embodiment, the method of reducing the amount of current may be a method of linearly reducing the amount of current using a specific current limit slope. Also, the method of reducing the amount of current may be a method of reducing the maximum current from the maximum motor torque current amount to the first limited torque current amount using an exponential graph. In addition, the method of reducing the amount of current may be a method of reducing the maximum current from the maximum motor torque current amount to the first limited torque current amount using a logarithmic graph. Also, the method of reducing the amount of current may be a method of reducing the maximum current from the maximum motor torque current amount to the first limited torque current amount using a step-wise graph. In addition, the method of reducing the amount of current may be a method of reducing the maximum current from the maximum motor torque current amount to the first limited torque current amount with a specific equation. Alternatively, the current limit slope and the current limit release slope may be set differently. For example, the current limit slope may be set to reach the second limited torque current amount in a shorter time than the current limit release slope. This is because it is necessary to quickly control the torque of the steering auxiliary motor to prevent problems due to heat generation at an early stage. That is, the current limit slope expressed in FIG. 6 is only an example of a method for reducing the maximum motor torque current amount to the first limited torque current amount, and there is no limitation on the method as long as the current is reduced by the first limited torque current amount.

Meanwhile, when releasing the limited torque determination in the first limited torque determiner 210, it is necessary to release the current limit of the maximum motor torque. In this case, since the limited motor torque is not determined, the motor current controller 140 is required to supply an unlimited maximum motor torque current amount to the steering auxiliary motor to provide the original maximum motor output.

Accordingly, the motor current controller 140 may supply more current by resetting the maximum current supplied to the steering auxiliary motor to the maximum motor torque current amount rather than the first limited torque current amount.

According to an embodiment, a method of increasing the amount of current may be a method of linearly increasing using a specific current limit slope. In addition, the method of increasing the amount of current may be a method of increasing the maximum current from the first limited torque current amount to the maximum motor torque current amount using an exponential graph. In addition, the method of increasing the amount of current may be a method of increasing the maximum current from the first limited torque current amount to the maximum motor torque current amount using a logarithmic graph. In addition, the method of increasing the amount of current may be a method of increasing the maximum current from the first limited torque current amount to the maximum motor torque current amount using a step-wise graph. In addition, the method of increasing the amount of current may be a method of increasing the maximum current from the first limited torque current amount to the maximum motor torque current amount with a specific equation. That is, the current limit release slope expressed in FIG. 6 is only one embodiment of a method for increasing the maximum current from the first limited torque current amount to the maximum motor torque current amount, and there is no limitation on the method as long as increasing from the first limited torque current amount to the maximum motor torque current amount.

Accordingly, the motor current controller 140 according to an embodiment may reduce the current that can be supplied to the steering auxiliary motor when the limited motor torque is determined, and may increase the maximum current that can be supplied to the steering auxiliary motor if necessary, so that the motor control may be performed according to the determination of the limited motor torque determiner 130.

Figure 7:
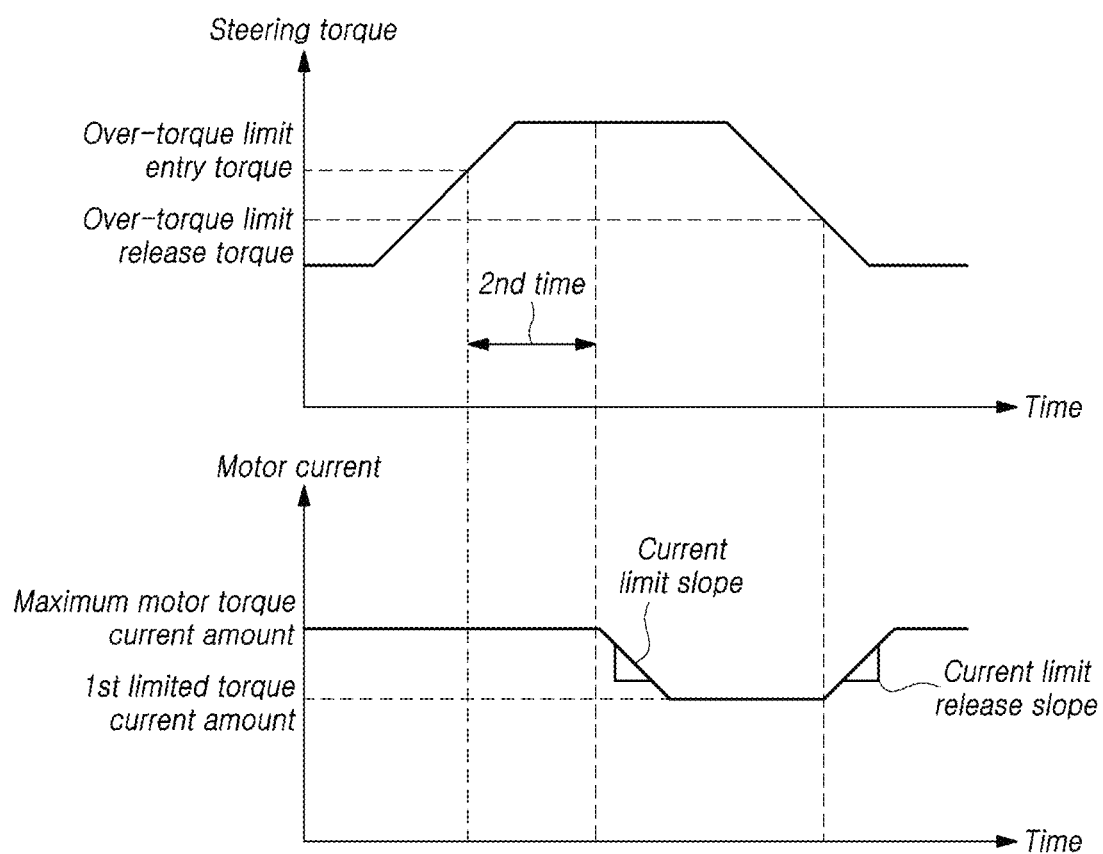
FIG. 7 is a diagram for explaining a method in which a motor current controller controls the maximum current value supplied to the steering auxiliary motor if the limited motor torque is determined as a second limited torque according to an embodiment.

FIG. 7 is a diagram for explaining a method in which a motor current controller 140 controls the maximum current value supplied to the steering auxiliary motor if the limited motor torque is determined as a second limited torque according to an embodiment.

Referring to FIG. 7, the motor current controller 140 according to an embodiment controls the steering auxiliary motor by supplying current based on the limited motor torque information. If the limited motor torque is determined as the second limited torque, the motor current controller may control the control current value corresponding to the second limited torque to be the maximum current value supplied to the steering auxiliary motor.

Specifically, the motor current controller 140 according to an embodiment may reduce the maximum amount of current supplied to the steering auxiliary motor if the limited motor torque is determined as the second limited torque by the second limited torque determiner 220. As described above, the case in which the limit is determined by the second limited motor torque may be a case in which the steering torque information maintains more than the second time longer more than the over-torque limit entry torque information.

In addition, according to an embodiment, the method of reducing the amount of current may be a method of linearly reducing the amount of current using a specific current limit slope. Also, the method of reducing the amount of current may be a method of reducing the maximum current from the maximum motor torque current amount to the second limited torque current amount using an exponential graph. In addition, the method of reducing the amount of current may be a method of reducing the maximum current from the maximum motor torque current amount to the second limited torque current amount using a logarithmic graph. Also, the method of reducing the amount of current may be a method of reducing the maximum current from the maximum motor torque current amount to the second limited torque current amount using a step-wise graph. In addition, the method of reducing the amount of current may be a method of reducing the maximum current from the maximum motor torque current amount to the second limited torque current amount with a specific equation. That is, the current limit slope expressed in FIG. 7 is only an example of a method for reducing the maximum motor torque current amount to the second limited torque current amount, and there is no limitation on the method as long as the current is reduced by the second limited torque current amount.

Meanwhile, when releasing the limited torque determination in the second limited torque determiner 220, it is necessary to release the current limit of the maximum motor torque. In this case, since the limited motor torque is not determined, the motor current controller 140 is required to supply an unlimited maximum motor torque current amount to the steering auxiliary motor to provide the original maximum motor output.

Accordingly, the motor current controller 140 may supply more current by resetting the maximum current supplied to the steering auxiliary motor to the maximum motor torque current amount rather than the second limited torque current amount. According to an embodiment, a method of increasing the amount of current may be a method of linearly increasing using a specific current limit slope. In addition, the method of increasing the amount of current may be a method of increasing the maximum current from the second limited torque current amount to the maximum motor torque current amount using an exponential graph. In addition, the method of increasing the amount of current may be a method of increasing the maximum current from the second limited torque current amount to the maximum motor torque current amount using a logarithmic graph. In addition, the method of increasing the amount of current may be a method of increasing the maximum current from the second limited torque current amount to the maximum motor torque current amount using a step-wise graph. In addition, the method of increasing the amount of current may be a method of increasing the maximum current from the second limited torque current amount to the maximum motor torque current amount with a specific equation. That is, the current limit release slope expressed in FIG. 7 is only one embodiment of a method for increasing the maximum current from the second limited torque current amount to the maximum motor torque current amount, and there is no limitation on the method as long as increasing from the second limited torque current amount to the maximum motor torque current amount.

Accordingly, the motor current controller 140 according to an embodiment may reduce the current that can be supplied to the steering auxiliary motor when the limited motor torque is determined, and may increase the maximum current that can be supplied to the steering auxiliary motor if necessary, so that the motor control may be performed according to the determination of the limited motor torque determiner 130.

As described with reference to FIGS. 1 to 7, the present embodiments may provide effects of preventing unnecessary torque application of the steering auxiliary motor in the EPS system and preventing reaching the heat resistance limit inside the motor to improve the stability and efficiency of the EPS system.

Hereinafter, it will be described a steering auxiliary motor control method capable of performing the above-described embodiments with reference to the drawings.

Figure 8:
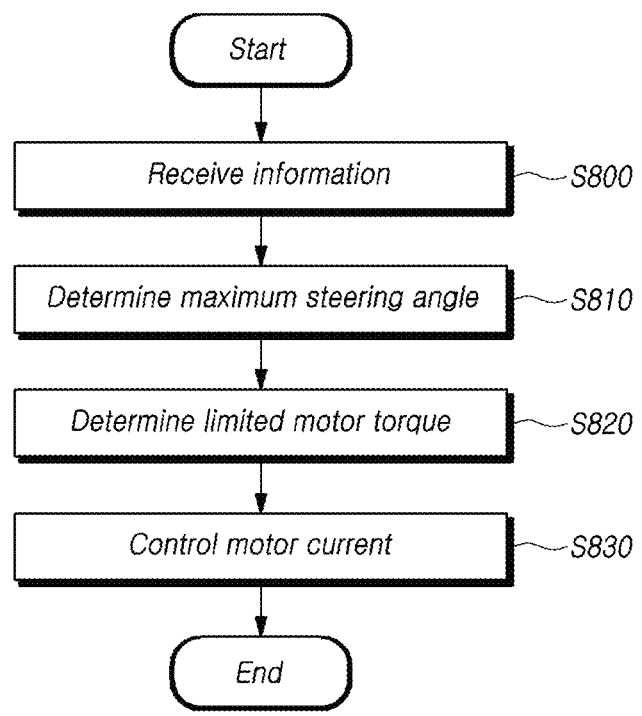
FIG. 8 is a diagram for explaining a steering auxiliary motor control method according to an embodiment.

FIG. 8 is a diagram for explaining a steering auxiliary motor control method according to an embodiment.

The steering auxiliary motor control method according to an embodiment may include a step of receiving steering angle information and driver steering torque information from a sensor included in a vehicle, a step of determining a maximum steering angle of the vehicle based on the steering angle information and a preset reference steering angle information, a step of determining a limited motor torque for limiting maximum motor torque outputted from a steering auxiliary motor based on at least one of a first condition including the steering angle information, maximum steering angle information and steering angle holding time information, and a second condition including the driver steering torque information, over-torque limit entry torque information, over-torque limit release torque information and steering torque holding time information, and s step of controlling the steering auxiliary motor based on the limited motor torque information. In addition to this, in one embodiment, a step for performing the above operation step by step may be further included, and some steps may be omitted or the order of the steps may be changed.

Referring to FIG. 8, in the step of receiving in the steering auxiliary motor control method according to an embodiment, the steering angle information and the steering torque information may be received through a steering angle sensor or a steering torque sensor mounted in the vehicle (S800). Also, according to an embodiment, there may be a plurality of sensors mounted inside or outside the vehicle for generating the information received in the receiving step. In addition, the above-described sensor may be a preliminary sensor in preparation for sensor error or failure in the vehicle. The steering angle information or steering torque information received by the receiver 110 may be information about an estimated value calculated using another sensor, not information directly received through the aforementioned sensor. Alternatively, in the step of receiving, the steering angle information or steering torque information may be determined by using the information received from the above-described sensor. For example, in the step of receiving, if the steering angle sensor is in error or malfunctions, there may be used the steering angle information calculated by estimating the driver's steering angle information using the torque information received from the torque sensor. As another example, if the steering torque sensor fails, there may be used the steering torque information calculated by estimating the driver's steering torque information using the received steering angle information. In addition, the information received in the step of receiving according to an embodiment is not limited to steering angle information or steering torque information, but may include steering angle holding time information, steering torque holding time information, and torque information of the steering auxiliary motor.

Meanwhile, the step of determining a maximum steering angle may include comparing the steering angle information with a reference steering angle information, and, if the value of the steering angle information exceeds the value of the reference steering angle information, updating the reference steering angle information with the steering angle information. In the step of determining a maximum steering angle, the reference steering angle information may be set as the maximum steering angle information when the update of the reference steering angle information occurs (S810).

In this case, the information for determining the excess is the respective steering angle values of the steering angle information and the reference steering angle information, and, if the steering angle by the driver becomes greater than the reference steering angle, the reference steering angle information may be updated to the steering angle information. Thereafter, the reference steering angle may be set as the maximum steering angle.

In addition, a reference steering angle information of the steering auxiliary motor control method according to an embodiment may include a clockwise reference steering angle information in case of rotating in a clockwise direction with respect to a zero steering angle and a counterclockwise reference steering angle information in case of rotating in a counterclockwise direction with respect to a zero steering angle. In determining the maximum steering angle, there may be distinguished between a case in which the steering angle information is input by being rotated clockwise based on the zero point steering angle and a case in which the steering angle information is input by being rotated counterclockwise, and may be compared with the clockwise reference steering angle information and the counterclockwise reference steering angle information, respectively.

That is, in an embodiment, the reference steering angle may be distinguished in two directions. Since the steering range of the vehicle can be divided into clockwise and counterclockwise directions, a case where the steering angle (absolute steering angle) is 0 may be set as the zero steering angle. Accordingly, the step of determining the maximum steering angle may include distinguishing between information input in a clockwise direction and information input in a counterclockwise direction based on the zero steering angle. For example, the step of determining the maximum steering angle may include distinguishing between the clockwise reference steering angle information when rotating in a clockwise direction based on the zero steering angle and the counterclockwise reference steering angle information rotating in a counterclockwise direction based on the zero steering angle. Accordingly, if the clockwise rotational steering angle exceeds the clockwise reference steering angle, the steering angle information is updated to the clockwise reference steering angle information, but the counterclockwise reference steering angle may be maintained. Similarly, if the counterclockwise rotational steering angle exceeds the counterclockwise reference steering angle, the steering angle information is updated to the counterclockwise reference steering angle information, but the clockwise reference steering angle may be maintained.

In addition, the step of determining the limited motor torque according to an embodiment may include determining a limited motor torque of the steering auxiliary motor to limit the maximum value of the torque output from the steering auxiliary motor to a predetermined value (S820). For example, the limited motor torque may be a value for limiting the maximum motor torque output by the steering auxiliary motor to a predetermined value. For example, the limited motor torque may be calculated as a predetermined ratio of the maximum motor torque output of the steering auxiliary motor. That is, the limited motor torque is set to a value within the maximum motor torque of the steering auxiliary motor to limit the maximum motor torque, and may be preset or calculated through the above-described operation. In order to set the limited motor torque, in determining the limited motor torque, there may be used the steering angle information or the steering torque information received in the step of receiving.

Meanwhile, the step of determining the limited motor torque may include determining a first limited torque and determining a second limited torque.

As an example, if it is determined that the state in which the steering angle information coincides with the maximum steering angle information is maintained for more than a preset first time, a first limited torque set to be less than or equal to the maximum motor torque value may be determined as the limited motor torque.

As another example, if it is determined that the driver steering torque information maintains more than an over-torque limit entry torque information for more than a preset second time, a second limited torque set to be equal to or less than the maximum motor torque value may be determined as the limited motor torque. In this case, the second limited torque may be determined as a predetermined ratio of the maximum motor torque value.

In this way, the step of determining the limited motor torque may further include determining the first limited torque as the limited motor torque based on the steering angle information and the maximum steering angle information, and determining the second limited torque as the limited motor torque based on the driver steering torque information and the over-torque limit entry torque information.

Meanwhile, in the case that the limited torque is calculated by dividing the above-described first limited torque and the second limited torque, it is required to determine which limited torque to determine as the limited motor torque.

For example, if conditions to which the first limited torque and the second limited torque are applied overlap and are satisfied, the limited motor torque may be determined based on each value of the first limited torque and the second limited torque and the preset conditions.

For example, the limited motor torque may be determined based on a preset priority among the first limited torque and the second limited torque. For example, if the steering angle by the driver reaches the maximum steering angle, the limited motor torque may be determined only by the first limited torque. As another example, the limited motor torque may be determined as a smaller value of the first limited torque and the second limited torque as the limited motor torque. For example, the limited motor torque may be determined according to a comparison result of the first limited torque and the second limited torque. For example, if the first limited torque is determined by satisfying the first limited torque condition when the priority is set so that the first limited torque has priority, the limited motor torque may be determined as the first limited torque regardless of the second limited torque value.

As another example, the step of determining the limited motor torque may include applying a preset weight to at least one of the first limited torque and the second limited torque, and determining an average value of the values to which the weight has been applied as the limited motor torque.

Meanwhile, the steering auxiliary motor control method according to an embodiment may further include controlling the steering auxiliary motor based on limited motor torque information (S830).

The controlling the steering auxiliary motor may include controlling the control current value corresponding to the limited motor torque to be the maximum current value supplied to the steering auxiliary motor when the limited motor torque is determined in the step of determining the limited motor torque. In this case, the controlling the steering auxiliary motor may include performing motor current control by dividing a case in which the limited motor torque is determined by the steering angle information and a case in which the limited motor torque is determined by the steering torque information.

As described above, the step of receiving, the step of determining the maximum steering angle, the step of determining the limited motor torque and the step of controlling the motor current may be implemented by one or more microprocessors operated by a set program, and the set program may include a series of instructions for performing each step included in the torque control method according to an embodiment of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering auxiliary motor control device comprising:
a receiver for receiving steering angle information and driver steering torque information from a sensor included in a vehicle;
a maximum steering angle determiner for determining a maximum steering angle of the vehicle based on the steering angle information and a preset reference steering angle information;
a limited motor torque determiner for determining a limited motor torque for limiting maximum motor torque outputted from a steering auxiliary motor based on at least one of a first condition including the steering angle information, maximum steering angle information and steering angle holding time information, or a second condition including the driver steering torque information, over-torque limit entry torque information, over-torque limit release torque information and steering torque holding time information;

a motor current controller for controlling the steering auxiliary motor by supplying current based on the limited motor torque determined by the limited motor torque determiner, wherein the limited motor torque determiner is configured to;

in response to the steering angle information coinciding with the maximum steering angle information for more than a preset first time, determine a first limited torque equal to or less than the maximum motor torque as the limited motor torque, and in response to a driver steering torque of the driver steering torque information maintaining greater than an over-torque limit entry torque of the over-torque limit entry torque information for more than a second preset time of the steering torque holding time information, determine a second limited torque equal to or less than the maximum motor torque as the limited motor torque, the motor current controller is configured to control, in response to the limited motor torque being determined, a control current value corresponding to the limited motor torque to be a maximum current value supplied to the steering auxiliary motor, and the motor current controller is configured to:

in response to the first limited torque being set as the limited motor torque, reduce the maximum current value supplied to the steering auxiliary motor from a maximum motor torque current amount to a first limited torque current amount using a current limit slope, and increase the maximum current value supplied to the steering auxiliary motor from the first limited torque current amount to the maximum motor torque current amount using a current limit release slope, the current limit release slope and the current limit slope being set differently.

2. The steering auxiliary motor control device of claim 1, wherein the maximum steering angle determiner is configured to compare the steering angle information with the preset reference steering angle information and update the preset reference steering angle information to the steering angle information in response to a value of the steering angle information exceeding a value of the preset reference steering angle information, and set the updated reference steering angle information as the maximum steering angle information.

3. The steering auxiliary motor control device of claim 2, wherein the reference steering angle information includes clockwise reference steering angle information in the case of rotating clockwise based on a zero steering angle and counterclockwise reference steering angle information in the case of rotating in a counterclockwise direction based on the zero steering angle, and wherein the maximum steering angle determiner is configured to distinguish between a case in which the steering angle information is input by being rotated clockwise based on the zero point steering angle and a case in which the steering angle information is input by being rotated counterclockwise, and compare with a clockwise reference steering angle information and a counterclockwise reference steering angle information, respectively.

4. The steering auxiliary motor control device of claim 1, wherein, the first limited torque is set to a value corresponding to a first ratio based on a value of the maximum motor torque as the limited motor torque.

5. The steering auxiliary motor control device of claim 1, wherein, the second limited torque is set to a value corresponding to a second ratio based on a value of the maximum motor torque as the limited motor torque.

6. The steering auxiliary motor control device of claim 1, wherein the maximum steering angle determiner further comprises:

a first limited torque determiner for determining the first limited torque as the limited motor torque based on the steering angle information and the maximum steering angle information; and a second limited torque determiner for determining the second limited torque as the limited motor torque based on the driver steering torque information and the over-torque limit entry torque information, and wherein, in response to conditions to which the first limit torque and the second limit torque are applied overlapping and being satisfied, the maximum steering angle determiner is configured to determine the limited motor torque based on each value of the first limited torque and the second limited torque.

7. The steering auxiliary motor control device of claim 6, wherein the maximum steering angle determiner is configured to determine a smaller value of the first limited torque and the second limited torque as the limited motor torque.

8. The steering auxiliary motor control device of claim 6, wherein the maximum steering angle determiner is configured to determine the limited motor torque based on a preset priority among the first limited torque and the second limited torque.

9. The steering auxiliary motor control device of claim 6, wherein the maximum steering angle determiner is configured to apply a preset weight to at least one of the first limited torque and the second limited torque, and determine an average value of the values to which the preset weight has been applied as the limited motor torque.

10. A steering auxiliary motor control method comprising:

receiving steering angle information and driver steering torque information from a sensor included in a vehicle;

determining a maximum steering angle of the vehicle based on the steering angle information and a preset reference steering angle information; and determining a limited motor torque for limiting maximum motor torque outputted from a steering auxiliary motor based on at least one of a first condition including the steering angle information, maximum steering angle information and steering angle holding time information, or a second condition including the driver steering torque information, over-torque limit entry torque information, over-torque limit release torque information and steering torque holding time information; and controlling the steering auxiliary motor by supplying current based on the limited motor torque, wherein the determining of the limited motor torque includes:

in response to the steering angle information coinciding with the maximum steering angle information for more than a preset first time, determine a first limited torque equal to or less than the maximum motor torque as the limited motor torque, in response to a driver steering torque included in the driver steering torque information maintaining greater than an over-torque limit entry torque included in the over-torque limit entry torque information for more than a second preset time included in the steering torque holding time information, determining a second limited torque equal to or less than the maximum motor torque as the limited motor torque, and the controlling of the steering auxiliary motor includes: controlling, in response to the limited motor torque being determined, a control current value corresponding to the limited motor torque to be a maximum current value supplied to the steering auxiliary motor, and the controlling of the steering auxiliary motor further includes:
in response to the first limited torque being set as the limited motor torque, reduce the maximum current value supplied to the steering auxiliary motor from a maximum motor torque current amount to a first limited torque current amount using a current limit slope, and
increase the maximum current value supplied to the steering auxiliary motor from the first limited torque current amount to the maximum motor torque current amount using a current limit release slope, the current limit release slope and the current limit slope being set differently.

11. The steering auxiliary motor control method of claim 10, wherein the determining of the maximum steering angle comprises
comparing the steering angle information with the preset reference steering angle information, and updating the reference steering angle information to the steering angle information in response to a value of the steering angle information exceeding a value of the preset reference steering angle information, and
setting the updated reference steering angle information as the maximum steering angle information.

12. The steering auxiliary motor control method of claim 10, wherein the first limited torque is set to a value corresponding to a first ratio based on a value of the maximum motor torque as the limited motor torque.

13. The steering auxiliary motor control method of claim 10, wherein the second limited torque is set to a value corresponding to a second ratio based on a value of the maximum motor torque as the limited motor torque.

14. The steering auxiliary motor control method of claim 10, wherein the current limit slope is set to reach a second limited torque current amount in a shorter time than the current limit release slope.

15. The steering auxiliary motor control device of claim 1, wherein the current limit slope is set to reach a second limited torque current amount in a shorter time than the current limit release slope.

* * * * *